(12) United States Patent
Daniel

(10) Patent No.: US 8,813,187 B1
(45) Date of Patent: Aug. 19, 2014

(54) AFFLUENT SOCIAL NETWORKING WEBSITE

(76) Inventor: Isaac S. Daniel, Miramar, FL (US)

( * ) Notice: Subject to any disclaimer, the term of this patent is extended or adjusted under 35 U.S.C. 154(b) by 38 days.

(21) Appl. No.: 13/550,403

(22) Filed: Jul. 16, 2012

Related U.S. Application Data

(60) Provisional application No. 61/508,395, filed on Jul. 15, 2011.

(51) Int. Cl.
*H04L 9/32* (2006.01)

(52) U.S. Cl.
USPC .............................. 726/2; 726/3; 726/4; 726/5

(58) Field of Classification Search
USPC ......... 713/150, 154, 163, 166, 168, 170, 183, 713/186; 726/2–5, 27–30
See application file for complete search history.

(56) References Cited

U.S. PATENT DOCUMENTS

| | | | |
|---|---|---|---|
| 8,112,501 B2 * | 2/2012 | Sampson et al. | 709/219 |
| 8,276,057 B2 * | 9/2012 | Rowe et al. | 715/205 |
| 8,387,122 B2 * | 2/2013 | Toomim et al. | 726/5 |
| 2008/0098313 A1 * | 4/2008 | Pollack | 715/753 |

* cited by examiner

*Primary Examiner* — Hosuk Song
(74) *Attorney, Agent, or Firm* — Carol N. Green, Esq.

(57) ABSTRACT

A system that includes at least one processor and computer executable instructions readable by the at least one processor and operative to host at least one affluent social networking web site, provide at least one artificial intelligence assistance service to a user of the at least one affluent social networking web site, and use a biometric identifier to verify the identity of the user or restrict access to at least a portion of the affluent social networking website.

21 Claims, 4 Drawing Sheets

AFFLUENT SOCIAL NETWORKING WEBSITE

PRIORITY DATA

The present application is a non-provisional of U.S. provisional patent application Ser. No. 61/508,395, titled "Artificial Intelligence Assistance Service System for Affluent Social Networking Website," filed on Jul. 15, 2011, by Isaac S. Daniel, whose priority is claimed and which is hereby incorporated by reference as if fully stated herein.

FIELD

The present disclosure relates generally to electronic systems, and more specifically to systems related to artificial intelligence assistance systems for guiding and assisting users in navigating and interacting with an affluent social networking website.

BACKGROUND

The use of social networking websites have become prevalent in modern society. Many popular websites, such as Facebook®, and Twitter®, have upwards of hundreds of millions of members. Social networking websites have revolutionized the way people communicate, share information, such as photos, movies, and the like, learn, and even get news.

One example of how important social networking websites have grown to be is the recent virtual "town hall" meeting held by U.S. President Barack Obama, on the social networking website Twitter®.

Social networking websites have been a boon to advertisers as well, since advertisements may be targeted to individual users based on user profiles.

Although social networking website users come in all shapes and sizes, the majority of social networking website users remain of a younger, non-affluent demographic. Affluent users have been reluctant to join, or at least frequently use, existing social networking websites due to privacy concerns and lack of socio-economic camaraderie.

SUMMARY

The various embodiments of games and methods described herein result from the realization that social networking websites may be made more accessible, useful, and appealing to affluent users by providing an affluent social networking website that incorporates an artificial intelligence assistance service.

Accordingly, the various embodiments and disclosures described herein solve the limitations of the prior art in a new and novel manner.

DETAILED DESCRIPTION OF PREFERRED EMBODIMENTS

System Level Overview

Figure 1A:
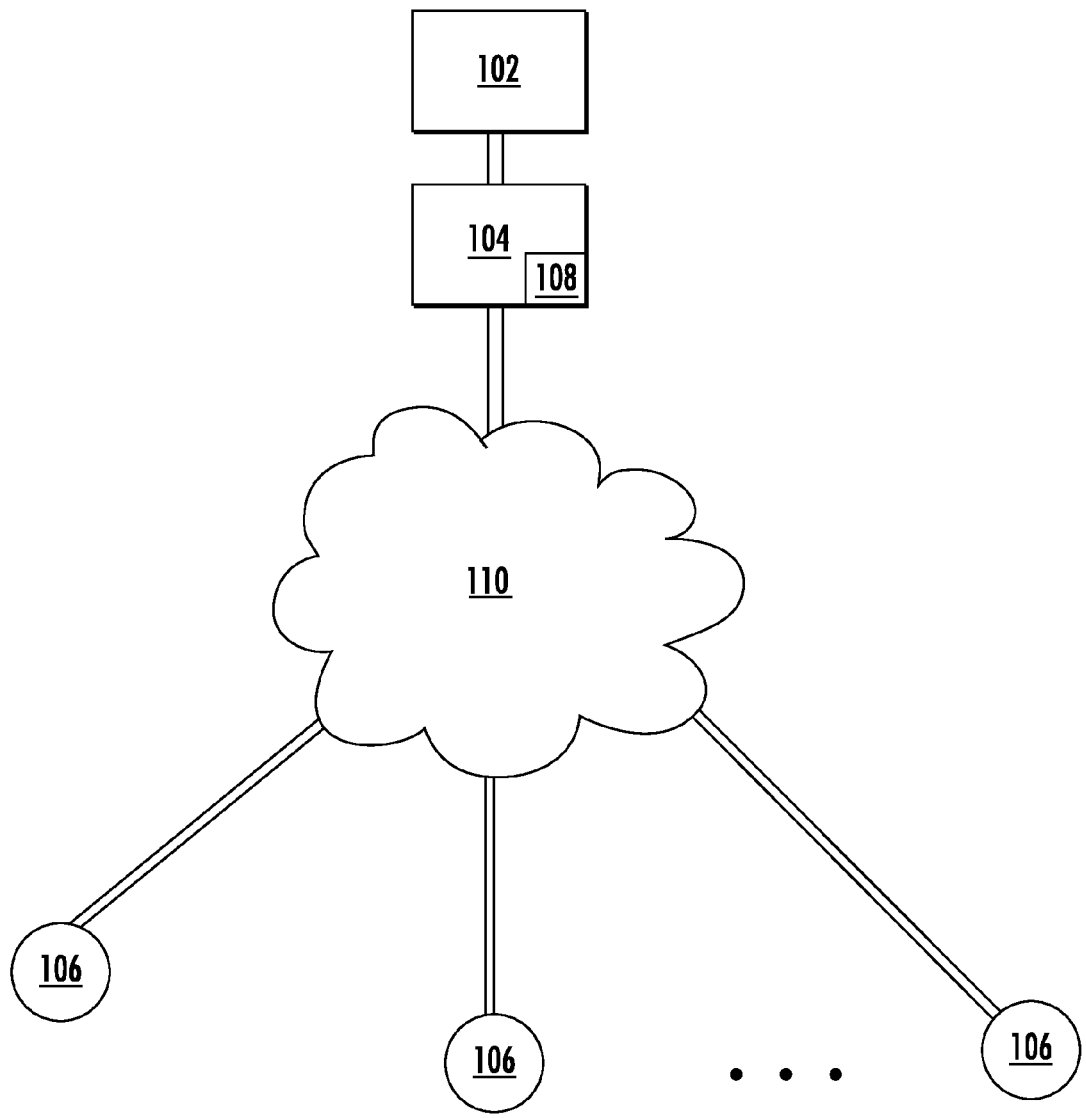
FIG. 1A shows a system in accordance with one embodiment.
Figure 1B:
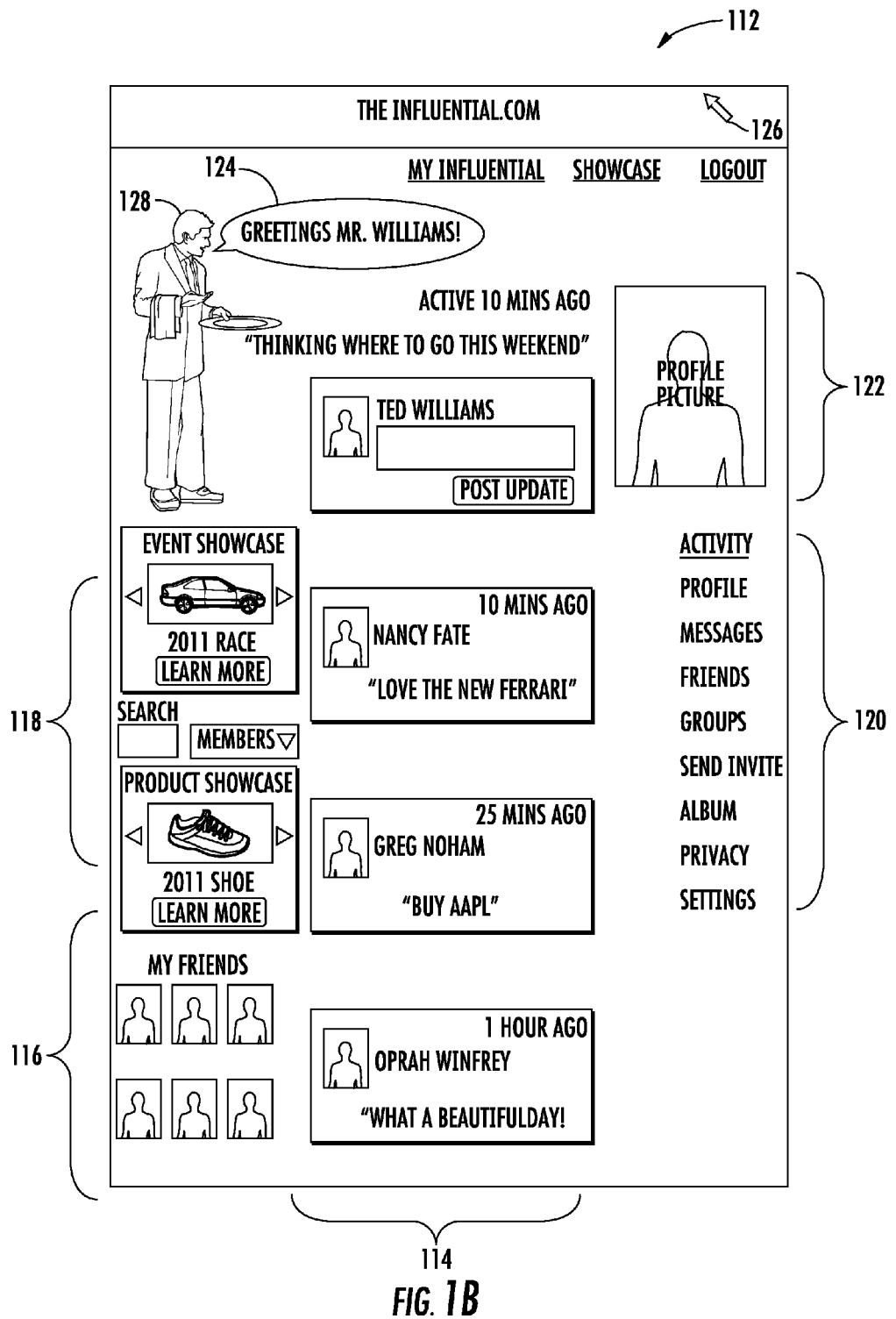
FIG. 1B shows a system in accordance with another embodiment.

Referring now to the drawings, FIGS. 1A and 1B show a system 100 in accordance with one embodiment, wherein system 100 comprises at least one processor 102, and computer executable instructions readable by the at least one processor and operative to host at least one affluent social networking website 104, and provide at least one artificial intelligence service 108 to a user 106 of the at least one affluent social networking website 104.

In some embodiments, at least one processor 102 may be any kind of processor, such as a single or multicore processor, a processor in a computer server, a processor in a content delivery system, and the like. System 100 may comprise of a plurality of processors 102, wherein each processor performs different functions, such as hosting a backend to a website (e.g. social networking website 104), storing user profiles, running the computer executable instructions, and the like.

In one embodiment, social networking website 104 may be accessible through a data network 110. Data network 110 may further comprise a network of members 106 and their respective electronics device (PCs, tablet PCs, smart phones, etc.), connected to each other and a server (which may include processor 102) through data network 110. Data network 110 may further comprise a private network, a public network, a local area network, or a wide area network (such as the internet or World Wide Web).

User 106 may be a user, such as a person, and may access social networking site 104 and/or data network 110 using a computing device, such as a PC, a tablet PC, a laptop, a smartphone, and the like.

In some embodiments, at least one affluent social networking website 104 may comprise any type of social networking website, such as those similar to Facebook.com, Twitter.com, MySpace.com, and the like. In a further embodiment, affluent social networking website 104 may be a social networking website whose membership is limited to affluent individuals. Affluent social networking website 104 may include a membership screening process, to see if applicants or potential members meet certain membership criteria, such as net worth, income, social status, occupation, location, social activities, income, assets, celebrity status, recommendations, criminal background, credit score, and the like. In a further embodiment, affluent social networking website 104 may include an invite-based membership registration process, an invite-only based membership registration process, or a referral-based membership registration process, to ensure that membership is limited to selected individuals. Access to social networking website 104 may be based on a user name and/or password combination, or on biometric identification means, such as fingerprint, eye scan, voice recognition, and the like.

Accordingly, the computer executable instructions may be operative to solicit or receive at least one application to join affluent social networking website 104. The application may be solicited via e-mail, regular mail, advertisement, word of mouth, and the like. The application may be received by electronic means, such as e-mail, electronic forms (e.g. online forms), fax, and the like. In an alternate embodiment, the application may be received by physical means, such as in-person, regular mail, and the like.

In some embodiments, the computer executable instructions may be operative to review the application and accept or reject the application based on any or all of the following criteria: income, assets, occupation, celebrity status, recommendations or referrals, criminal background, and credit score. In some embodiment, the application may require users to submit information related to said criteria. For example, users may be required to show proof of income, such as tax returns, and the like. In another embodiment, the computer executable instructions may be operative to verify the information submitted on the application, such as by querying databases, such as criminal background check services, and the like.

In yet another embodiment, reviewing the application comprises comparing information related to the criteria submitted on the application with predefined, preset, or predetermined acceptable criteria. For example, the acceptance of an application to join affluent social networking website 104 may be conditioned on users having a certain income level, certain types of occupation, certain amount of assets, certain level of celebrity status, certain recommendations or referrals, certain criminal background (or no criminal background), certain credit score, and the like.

In one embodiment, the computer executable instructions may be operative to continually or periodically ensure that the application criteria are met and maintained even after user 106's application has been an accepted or after user 106 has become a member. This may include using credit reporting agencies and background check agencies to collect information related to said criteria.

In some embodiments, the computer executable instructions may be operative to use at least one biometric reader to collect at least one biometric identifier from user 106, and use the biometric identifier as a means to restrict access to at least a portion of the affluent social networking website 104. For example, a user may be required to submit a biometric identifier along with his or her application to join affluent social networking website 104. The biometric identifier may be used to verify the user's identity in the initial application, and if the user is accepted as a member, may be used thereafter to authenticate the user when the user is trying to access the affluent social networking website 104 or a portion thereof, such as a high-security portion or a portion that contains sensitive information.

The biometric identifier may comprise any type of biometric identifier, such as a fingerprint, an eye scan, a voice recognition identifier, and the like.

In yet another embodiment, the computer executable instructions may be operative to provide at least one biometric reader to collect at least one biometric identifier from at least one user (or potential user) of affluent social networking website 104. The term "user" as used herein, may refer to a user or potential user of affluent social networking website 104. The computer executable instructions may be operative to use the biometric identifier as a means for restricting access to affluent social networking website 104 or a portion thereof. In some embodiments, the biometric identifier may be used to verify the user's identity in the initial application, and if the user is accepted as a member, may be used thereafter to authenticate the user when the user is trying to access the affluent social networking website 104 or a portion thereof, such as a high-security portion or a portion that contains sensitive information. They biometric reader may be provided to the user (or potential user) after the user's application has been received, or after the user's application has been accepted. Providing a biometric reader to a user may comprise mailing a biometric reader to a user, to keep or on loan, requesting that user go to an authorized biometric reading center, or provide a biometric reading application for use with a biometric reader already available to the user, such as in the case of a touch screen panel, a camera, a microphone, or a fingerprint reader, wherein said biometric reader may be connected to the device the user uses to access or apply to the affluent social networking website 104.

Affluent social networking site 104 may comprise a user interface 112, which may comprise of multiple layers or sections. In an exemplary embodiment, user interface 112 comprises typical social networking website features, such as an update stream 114, where news updates, users posts, friend posts, and the like can be featured, a friend list 116, event and product/service advertising 116, a navigation menu 120, a profile picture 122 and the like.

In some embodiments, providing at least one artificial intelligence assistance service comprises providing at least one prompt 124 to user 106, learning user 106's interests and preferences, making suggestions based on user 106's interests and preferences, developing a profile of user 106 for more effective suggestions, and assuming control of website navigation. In one embodiment, at least one prompt 124 comprises an audible prompt, such as a noise, a question, a phrase, and the like, a visible prompt, such as words, a symbol, or image, or a tactile prompt such as a vibration or change in temperature.

Providing at least one prompt 124 may comprise providing at least one prompt 124 based on user input. The user input may be an audible user input, such as a voice command. The user input may be based on user input using an input device, such as a keyboard, mouse, pen, touchscreen, and the like. User input may further comprise moving a user input means such as a cursor 126, or touching a touch screen, on or over or selecting a certain portion of user interface 112.

Prompt 124 may comprise an update, such as whether user 106 has received a new message or invitation. Prompt 124 may comprise a suggestion regarding which events to attend, which products to purchase, or which portion of website 104 user 106 would like to access. Prompt 124 may also comprise news updates, such as social media news, local news, international news, sports news, political news, financial news, and the like.

In some embodiments, learning user 106's interests and preferences may be based on analyzing user 106's website use statistics, such as topics of messages or comments, links clicked on, videos viewed, products purchased, events attended, and the like. In a further embodiment, learning user 106's interests and preferences may comprise taking into account user input, such as preferences user 106 has set or input user 106 has made regarding what their interests are, such as input collected via a questionnaire or form.

In a further embodiment, developing a profile of user 106 for more effective suggestions may comprise compiling a profile of user 106's interests, web activity, and the like to develop a marketing profile of user 106, upon which product or event suggestions may be based, as well as relevant news or news feeds may be provided.

In yet another embodiment, assuming control of website navigation may comprise assuming control of website navigation upon request of user 106 or with user 106's approval. Assuming control of website navigation may be made for instructional purposes, such as to teach user 106 how to navigate website 104 or access certain functions within website 104. In another embodiment, assuming control of website navigation may be made for convenience purposes, so user 106 does not have to navigate through the website, but instead can focus on other activities.

In one embodiment, the computer executable instructions may be further operative to require the utilization of at least one private means for listening before providing access to the at least one social networking site 104, or any function thereof, including the at least one artificial intelligence assistance service 108. The private means for listening may comprise headphones, such as wired or wireless headphones. The process of requiring the utilization of at least one private means for listening may comprise checking for the presence or connection of such listening means to a device user 106 may be using to access website 104. By requiring that a private listening means be used, user privacy is ensured because anyone present near user 106 will not be able to hear what is being communicated through website 104 or any of its functions.

In a further embodiment of system 100, providing at least one artificial intelligence assistance service comprises providing at least one animated character 128 to assist user 106 in using affluent social networking website 104. In some embodiments, animated character 128 may comprise at least one butler. In another embodiment, animated character 128 may speak to user 106, either through audible words or through text bubbles. In another embodiment, at least one prompt 124 may be made by animated character 128. In a further embodiment, interaction between at least one user 106 and character 128 may be interactive, wherein character 128 is able to understand user 106's input, either through text or speech, and is able to respond to user 106 or make suggestions or further inquiry. In yet another embodiment, the presence of character 128 may be set or chosen by user 106

Accordingly, in a further embodiment, the computer executable instructions may be further operative to provide user 106 with user programmable settings, which may include user interface 112 layout, artificial intelligence assistance service 108 settings, and other settings within social networking website 104, such as language, time settings, profile settings, theme settings, notification settings, privacy settings, account settings, and the like.

Method Embodiments

Figure 2:
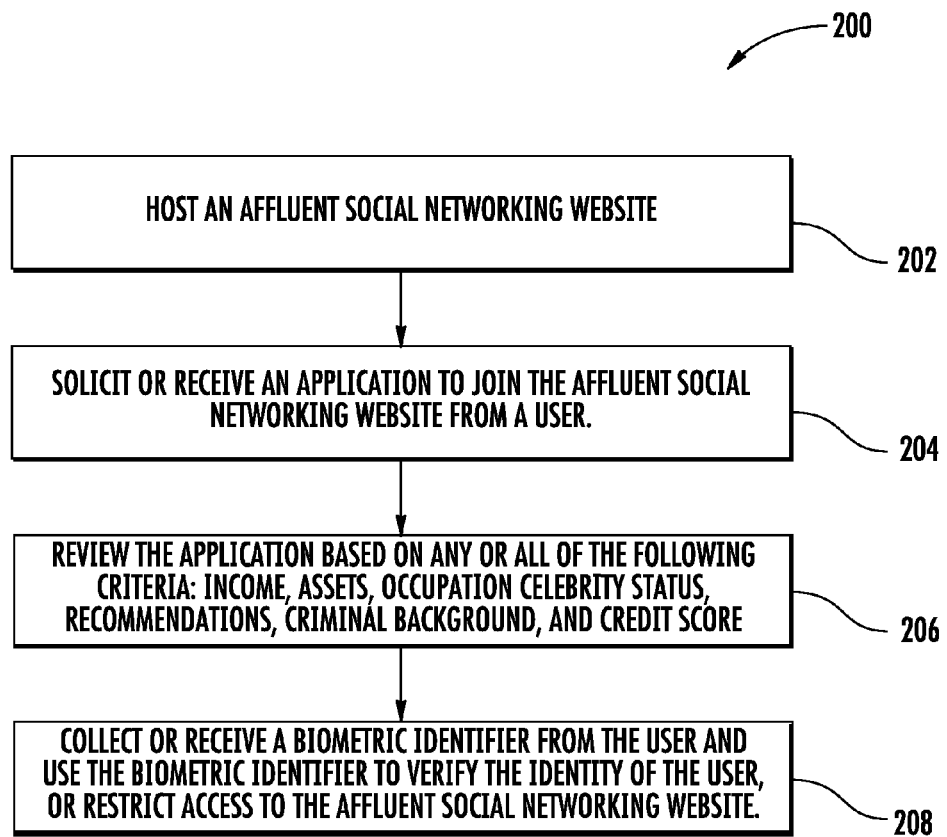
FIG. 2 shows a block diagram depicting a method in accordance with one embodiment.

Referring now to FIG. 2, a block diagram depicting a method 200 is shown in accordance with one embodiment, wherein method 200 comprises using at least one processor to perform any or all of the following: host an affluent social networking website (block 202), solicit or receive an application to join the affluent social networking website from a user (block 204), review the application based on any or all of the following criteria: income, assets, occupation, celebrity status, recommendations, criminal background, and credit score (block 206), and collect or receive a biometric identifier from the user and use the biometric identifier to verify the identity of the user or restrict access to at least a portion of the affluent social networking website (block 208).

In some embodiments, the at least one processor may be any type of processor, such as any of the various embodiments described herein.

In one embodiment, the affluent social networking website may be any type of social networking website, such as any of the various embodiments described herein.

In another embodiment, hosting an affluent social networking website may involve any of the various processes or systems described above with reference to FIGS. 1A through 2.

In yet another embodiment, soliciting or receiving an application to join the affluent social networking website from a user may involve any of the various processes or systems described above with reference to FIGS. 1A through 2.

In yet another embodiment, reviewing the application based on the aforementioned criteria may involve any of the various processes or systems described above with reference to FIGS. 1A through 2, and the criteria may comprise any of the criteria described herein.

In another embodiment, collecting or receiving a biometric identifier from the user may involve any of the various processes or systems described above with reference to FIGS. 1A through 2.

In one embodiment, verifying the identity of the user or restricting access to at least a portion of the affluent social networking website may involve any of the various processes or systems described above with reference to FIGS. 1A through 2.

In some embodiments, method 200 may comprise providing a biometric reader to the user to collect the biometric identifier. The step of providing the biometric reader may involve any of the various processes or systems described above with reference to FIGS. 1A through 2.

In another embodiment, reviewing the application comprises comparing information related to the criteria submitted on the application with predefined acceptable criteria, wherein said step may involve any of the various processes or systems described above with reference to FIGS. 1A through 2.

In yet another embodiment, method 200 may further comprise providing at least one artificial intelligence assistance service to at least one user of the affluent social networking website, wherein said step may involve any of the various processes or systems described above with reference to FIGS. 1A through 2.

Hardware and Operating Environment

This section provides an overview of example hardware and the operating environments in conjunction with which embodiments of the inventive subject matter can be implemented.

A software program, such as a golf video game, may be launched from a computer readable medium in a computer-based system to execute the functions defined in the software program. Various programming languages may be employed to create software programs designed to implement the systems and methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 3 below.

Figure 3:
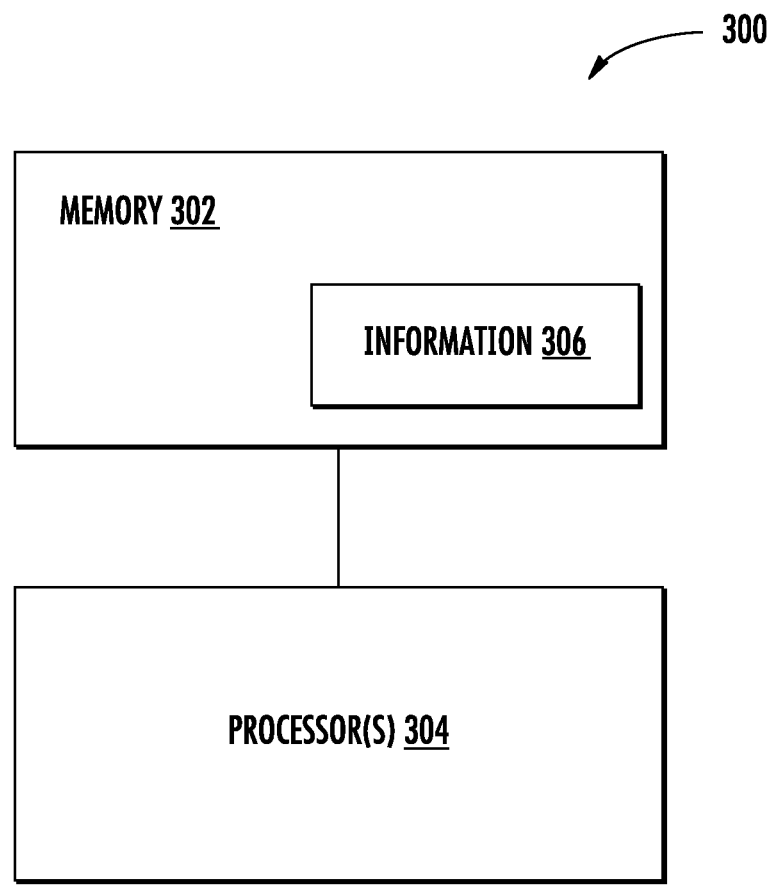
FIG. 3 shows an apparatus in accordance with one embodiment.

FIG. 3 is a block diagram representing an apparatus 300 according to various embodiments. Such embodiments may comprise a computer, a video gaming console, a memory system, a magnetic or optical disk, some other storage device, or any type of electronic device or system. The apparatus 300 may include one or more processor(s) 304 coupled to a machine-accessible medium such as a memory 302 (e.g., a memory including electrical, optical, or electromagnetic elements). The medium may contain associated information 306

(e.g., computer program instructions, data, or both), which, when accessed, results in a machine (e.g., the processor(s) 304) performing the activities previously described herein.

The principles of the present disclosure may be applied to all types of computers, gaming consoles, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system comprising:
  a. at least one processor; and
  b. computer executable instructions readable by the at least one processor and operative to:
    i. host at least one affluent social networking website;
    ii. provide at least one artificial intelligence assistance service to at least one user of the at least affluent social networking web site;
    iii. provide a biometric reader to the at least one user; and
    iv. use the biometric reader to collect at least one biometric identifier from at least one user, and use the at least one biometric identifier to restrict access to at least a portion of the affluent social networking website.

2. The system of claim 1, wherein providing at least one artificial intelligence assistance service comprises:
  a. providing at least one prompt to the user;
  b. learning the user's interests and preferences;
  c. making suggestions based on the user's interests and preferences;
  d. developing a profile of the user to make more effective suggestions; and
  e. assuming control of website navigation.

3. The system of claim 2, wherein the at least one prompt is an audible prompt, a visible prompt, or a tactile prompt.

4. The system of claim 2, wherein providing at least one prompt to the user comprises providing at least one prompt to the user based on user input.

5. The system of claim 1, wherein the computer executable instructions are further operative to require the utilization of at least one private means for listening before providing access to the at least one affluent social networking websites, or any function thereof.

6. The system of claim 1, wherein providing at least one artificial intelligence assistance service comprises providing at least one animated character to assist the user in using the affluent social networking website.

7. The system of claim 6, wherein the animated character comprises at least one butler.

8. The system of claim 1, wherein the computer executable instructions are further operative to provide the user with user programmable settings.

9. The system of claim 1, wherein the computer executable instructions are further operative to solicit or receive at least one application to join the at least one affluent social networking website.

10. The system of claim 9, wherein the computer executable instructions are further operative to review the application and accept or reject the application based on any or all of the following criteria:
  a. income;
  b. assets;
  c. occupation;
  d. celebrity status;
  e. recommendations;
  f. criminal background; and
  g. credit score.

11. The system of claim 10, wherein reviewing the application comprises comparing information related to the criteria submitted on the application with predefined acceptable criteria.

12. The system of claim 1, wherein providing a biometric reader to the at least one user comprises:
  a. mailing a biometric reader to the at least one user;
  b. requesting that user go to an authorized biometric reading center; or
  c. providing a biometric reading application to the at least one user.

13. The system of claim 12, wherein the computer executable instructions are further operative to provide the at least one user with the biometric reader once the at least one user has been approved to be a member of the social networking website.

14. The system of claim 1, further comprising at least one biometric reader to collect at least one biometric identifier from at least one user.

15. A system comprising:
  a. at least one processor; and
  b. computer executable instructions readable by the at least one processor and operative to:
    i. host at least one affluent social networking web site;
    ii. solicit or receive at least one application to join the one affluent social networking website;
    iii. provide a biometric reader to the at least one user;
    iv. use the biometric reader to collect at least one biometric identifier from at least one user, and use the at least one biometric identifier to restrict access to at least a portion of the affluent social networking website; and
    v. provide at least one artificial intelligence assistance service to a user of the at least one affluent social networking web site; wherein providing at least one artificial intelligence service comprises:
      1. providing at least one prompt to the user;
      2. learning the user's interests and preferences;
      3. making suggestions based on the user's interests and preferences;
      4. developing a profile of the user to make more effective suggestions; and
      5. assuming control of website navigation.

16. The system of claim 15, wherein providing a biometric reader to the at least one user comprises:
  a. mailing a biometric reader to the at least one user;
  b. requesting that user go to an authorized biometric reading center; or
  c. providing a biometric reading application to the at least one user.

17. The system of claim 16, wherein the computer executable instructions are operative to provide the at least one user with the biometric reader once the at least one user has been approved to be a member of the social networking website.

18. A method comprising:
  a. using at least one processor to perform the following:

i. host an affluent social networking website;
ii. solicit or receive an application to join the affluent social networking website from a user;
iii. review the application based on any or all of the following criteria:
   1. income;
   2. assets;
   3. occupation;
   4. celebrity status;
   5. recommendations;
   6. criminal background; and
   7. credit score;
iv. provide a biometric reader to the at least one user; and
v. use the biometric reader to collect or receive a biometric identifier from the user and use the biometric identifier to:
   restrict access to at least a portion of the affluent social networking web site.

19. The method of claim 18, wherein providing a biometric reader to the at least one user comprises:
a. mailing a biometric reader to the at least one user;
b. requesting that user go to an authorized biometric reading center; or
c. providing a biometric reading application to the at least one user.

20. The method of claim 18, wherein reviewing the application comprises comparing information related to the criteria submitted on the application with predefined acceptable criteria.

21. The method of claim 18, further comprising providing at least one artificial intelligence assistance service to at least one user of the affluent social networking website.

* * * * *